United States Patent Office 3,200,110
Patented Aug. 10, 1965

3,200,110
PROCESS FOR THE PREPARATION OF
LAMINARIN SULFATES
Ronald Arthur Gollin, Robert Michaelis, Dennis Walker, and Stewart Sanders Adams, all of Nottingham, England, assignors to Boots Pure Drug Company Limited, Nottingham, England, a British company
No Drawing. Filed Dec. 13, 1960, Ser. No. 75,480
Claims priority, application Great Britain, Dec. 24, 1959, 43,906/59
7 Claims. (Cl. 260—210)

This invention is for improvements in or relating to a process for making derivatives of laminarin which possess valuable therapeutic properties and to therapeutic compositions based thereon. More particularly it relates to the provision of therapeutically acceptable salts of laminarin sulfuric acids, and their use in the treatment of atherosclerosis.

It has recently been found that salts of laminarin sulfuric acid possess antilipaemic activity but unfortunately these laminarin sulfates also possess significant blood anticoagulant properties. It is important that a substance which is used as an antilipaemic agent and which, therefore, has to be administered in small doses over prolonged periods should not possess any significant anticoagulant activity. Hence, the antilipaemic activity of laminarin sulfates can only be utilised in clinical medicine if laminarin sulfates can be prepared which possess antilipaemic activity but no significant anticoagulant activity or in which the ratio of antilipaemic to anticoagulant activity is so large that the laminarin sulphate would exert no significant anticoagulant activity when administered in dosages at which it exerts antilipaemic activity.

It is an object of the present invention to provide a method of producing laminarin sulfates with desirable properties of the above-mentioned nature.

It is a further object of the present invention to provide improved therapeutic compositions comprising laminarin sulfate as the active ingredient.

Another object of the present invention is to provide a new method of treating lipaemia and atherosclerosis.

Laminarin is a polysaccharide which is composed mainly of units of glucose but also contains units of mannitol. It is present in certain varieties of seaweed, in particular the species *Laminaria cloustoni* and it may be extracted therefrom by simple means, e.g., with hot water. Laminarin may be sulfated to give laminarin sulfuric acids which form stable salts, e.g., sodium laminarin sulfate and the term "laminarin sulfate" in this specification is generally employed to denote a stable salt. The degree to which laminarin is sulfated, i.e., the proportion of residues of sulfuric acid in the laminarin molecule may be varied and it is found that the therapeutic properties of the resulting laminarin sulfate may vary accordingly.

The present invention is concerned with the conversion of either intact or partially degraded laminarin into stable derivatives of laminarin sulfuric acids which are valuable in the treatment of lipaemia and atherosclerosis.

The method for the preparation of laminarin sulfates which has previously been described involves the treatment of water-insoluble laminarin with chlorosulfonic acid in pyridine solution. This reaction is a two-phase reaction the laminarin being present in suspension; it is also very difficult to carry out on other than a laboratory scale since the insoluble laminarin becomes glutinous in nature on treatment with the chlorosulfonic acid. Further, in view of the fact that the laminarin becomes glutinous the sulfation of the laminarin does not proceed uniformly and the reaction product contains unsulfated laminarin together with a mixture of laminarin sulfates of different degrees of sulfation. These different fractions require to be separated by a laborious process which adds greatly to the cost of the final product. Certain of the fractions obtained in this way have been demonstrated to have antilipaemic activity of a low order but it is extremely difficult to produce fractions with reproducible activity by the above method.

We have now found that laminarin sulfates suitable for the treatment of lipaemia can be prepared readily by a process which involves reacting laminarin dissolved or suspended in a dialkylformamide or dialkylacetamide, with a sulfating agent. Further we have made the very valuable discovery that if the reaction is carried out at low temperature, i.e., temperatures at or below 0° C., a laminarin sulfate is obtained which possesses the required high degree of antilipaemic activity and low degree of anticoagulant activity. If the reaction is carried out above 0° C. using undegraded laminarin a product is obtained which possesses too high an anticoagulant activity to be of use clinically. If the reaction is carried out above 0° C. using partially degraded laminarin a product is obtained which may be of use clinically but which is inferior to the product of a reaction between similar starting materials at a low temperature.

According to the present invention there is provided a process for the preparation of a laminarin sulfate of high anti-lipaemic activity and of low anticoagulant activity which comprises subjecting laminarin to sulfation dissolved or suspended in a reaction medium of the general formula:

where R represents H or methyl and R' represents methyl or ethyl.

The invention also includes therapeutic compositions comprising laminarin sulfate made according to the method of the present invention as the active ingredient.

According to another aspect of the invention there is also provided an improved method of treatment of lipaemia and atherosclerosis by utilising the laminarin sulfate made according to the method of the present invention.

The process of the invention necessitates reacting laminarin with sulfating agents in a solvent in which both reactants are either soluble and in which the resulting laminarin sulfuric acids are also soluble or are suspended in a medium in which the laminarin and laminarin sulfate do not form a glutinous mass during sulfation but remain granular. This requirement necessarily limits the choice of reaction medium and we have found that the most satisfactory for the purpose of the invention are N:N-dialkyl derivatives of formamide and acetamide, for example, dimethylformamide. Dimethylformamide is particularly valuable since not only is it an excellent solvent for laminarin and for laminarin sulfuric acid but it and diethylformamide can be employed in the formation of certain sulfating agents which can be used to great advantage in the process of the invention. Thus the above solvents form complexes with sulfur trioxide and these complexes are highly active sulfating agents and are very suitable for use in the process of the invention. The said complexes may be formed by treating the substituted formamide with sulfur trioxide in the liquid or gaseous state. The reaction is highly exothermic and is preferably carried out with vigorous cooling, for example in a bath at a temperature of −40° C. The reaction is preferably carried out in a closed vessel in order to minimise the loss of sulfur trioxide by evaporation and if this precaution is observed any required quantity of the complex can be prepared by adding a measured quantity of liquid or gaseous sulfur trioxide to the formamide.

The resulting product contains the desired complex in suspension or solution and can be transferred readily to the reaction vessel in which the sulfation is to be performed.

The temperature at which the sulfation is carried out is critical and we have found when undegraded laminarin is sulphated that unless the reaction is maintained at a temperature of 0° C. or less until sulfation has ceased, the resulting product will possess anticoagulant activity of too high an order to be useful in clinical medicine. We prefer to maintain the temperature of the reaction mixture within the range of −20° C. to −30° C. in order to achieve the most desirable results, even when degraded laminarin is sulfated.

For this reason it is desirable to limit the heat of reaction during sulfation and we prefer to sulphate with a dialkylformamide sulfur trioxide complex. We do not exclude from our invention direct sulfation with gaseous sulfur trioxide provided that sufficient agitation and cooling is provided to maintain a sufficiently low reaction temperature.

The reaction is preferably carried out under substantially anhydrous conditions although traces of moisture do not appear to affect the reaction adversely.

The degree of sulfation is of importance. Thus we have found that little anti-lipaemic activity is to be found in products which contain less than 0.9 sulfate group per monosaccharide residue. We prefer not more than 2 sulfate groups per monosaccharide residue or the compounds may become unstable. The degree of sulfation is readily controlled by employing the required quantity of sulfating agent since the reaction appears to proceed substantially quantitatively.

In a preferred embodiment of the invention, the required quantity of liquid sulfur trioxide is dissolved portionwise in dimethylformamide contained in a vessel suitably trapped to exclude moisture the mixture being cooled to −40° C. throughout. The resulting solution (which may partially crystallise but which will redissolve during the course of the reaction) is then added slowly to a solution of laminarin in dimethylformamide, the reaction mixture being maintained at −20° C. to −30° C. throughout. A clear solution is thereby formed and after stirring for a short period of time at the above temperature the laminarin sulfate is isolated therefrom in the form of its sodium salt by pouring the solution into water containing sufficient sodium hydroxide to ensure that the final pH will be in excess of 8.0 thereby eliminating the possibility of acid-hydrolysis of the reaction product. The resulting aqueous solution is then treated with an excess of a water-miscible organic solvent, for example, alcohol in which the laminarin sulfate is insoluble and the precipitate so formed is collected. The laminarin sulfate dissolved in water may then be freed from inorganic impurities by dialysis or by precipitation of an organic salt of laminarin sulfuric acid insoluble in water, for example, the dimethyldodecylamine salt followed by conversion to the sodium salt.

If a salt other than the sodium salt is required the isolation procedure may then be modified in an appropriate manner, or the sodium salt may be isolated as described above and converted to the required salt by processes of ion-exchange or double decomposition which are well-known in the art.

If required, the laminarin sulfate may be further purified and dark coloured and toxic impurities removed by an oxidation process. We have found that the addition of sodium permanganate solution at pH 8 to 9 gives particularly valuable results.

The preparation of laminarin sulfate by sulfation of the naturally occurring laminarin has been described and indeed preparations suitable for administration to human beings may be prepared from such material.

It has been discovered, however, that laminarin sulfate of a lower molecular weight when administered to animals at a very high dosage is even less toxic than the higher molecular weight material. Accordingly the sulfation of partially degraded laminarin is within the scope of our invention.

Degraded laminarin suitable for sulfation to give a valuable antilipaemic product may be prepared by enzymic degradation or by chemical hydrolysis.

It is important that over-hydrolysis should not occur as the degraded laminarin when sulfated would be antilipaemically inactive at degrees of sulfation consistent with stability. We have found that mild hydrolysis in the presence of a mineral acid gives a degraded laminarin which possesses particularly valuable properties after it is sulfated.

In a preferred method of degradation laminarin is refluxed with 0.025 N hydrochloric acid and the hot solution is charcoaled to remove a little colour. The decolourised solution is precipitated with ethyl alcohol and the precipitated degraded material dissolved in water and dialysed if desired to remove very low molecular weight fractions. The degraded laminarian is then isolated by precipitation with a water miscible solvent, preferably ethanol.

The degree of polymerisation of laminarin and partially degraded laminarian is estimated by the method of Anderson, Hirst, Manners and Ross (J. Chem. Soc., 1958, 3233), wherein the end groups are oxidised to formaldehyde with periodic acid. The formaldehyde is estimated colorimetrically with chromotropic acid and the molecular weight calculated therefrom.

For optimum results we prefer to sulfate laminarian of a molecular weight within the range 1500–3500 which is equivalent to a degree of polymerisation of 9 to 20.

The anticoagulant activity of the preparations is assayed by the standard biological assay for heparin described in the British Pharmacopoeia, 1953, page 833.

There is no standard assay procedure for anti-lipaemic activity and the activities of the laminarin sulfate preparations are compared with that of heparin, whose antilipaemic effect has been shown clinically. The value of heparin and laminarin sulfate as antilipaemic agents is considered to be due to the liberation in the blood stream of a patient of a substance called "clearing factor" following injection of these substances. The presence of clearing factor may be demonstrated by secondary changes in the mobility of serum lipoproteins particularly the beta-lipoprotein band when studied electrophoretically in pH 8.6 barbitone buffer. In one method of assay which we employ a laminarian sulfate preparation is injected subcutaneously into a rat and a sample of serum is obtained from the animal after one hour. Serum samples from similar rats injected with heparin and from control rats are obtained in an identical way. The rat sera are incubated for 2 hours at 37° C. with an equal volume of human serum and, at the end of this time the mixed sera are studied electrophoretically on the same sheet of paper. The movement of the beta-lipoprotein band induced by injection of laminarin sulfate is compared directly with the movement induced by the injection of heparin. For convenience an arbitrary figure of 100 units per milligram is taken as the antilipaemic activity of normal beef heparin containing 100 anticoagulant units per milligram and the corresponding activity of laminarin sulfate is expressed by the following formula:

$$\text{Antilipaemic activity} = \frac{100}{n} \text{ units/mg.}$$

where $n$ is the number of milligrams of the compound which gives the same antilipaemic test response as 100 units of normal sodium heparin.

The presence of clearing factor may also be demonstrated by its ability to thin or clear artificial fat emulsions. In another method of assay which we employ a laminarin sulfate preparation is injected subcutaneously into a rat and after one hour the animal is anaethetised and the blood collected in oxalated centrifuge tubes which are immediately cooled in an ice bath. The plasma is collected by centrifugation. To 1 ml. of plasma is added an equal volume of distilled water, the diluted plasma is warmed to 30° C. and 0.1 ml. of a 1% solution of Ediol (registered trademark) a commercially available coconut oil emulsion is added and the whole thoroughly mixed. The optical density of the mixture is measured immediately in an absorptiometer and again after the sample has been incubated at 30° C. for 30 minutes. The decrease in optical density is a measure of the clearing factor activity in the plasma. The effect of three graded doses of laminarin sulfate are compared with that of three similar doses of heparin and the antilipaemic activity is expressed as described in the previous assay method.

The therapeutic value of any preparation of laminarin sulfate is indicated by the "activity coefficient" which is expressed as the ratio between its antilipaemic activity and its anticoagulant activity and obviously preferred compounds have the highest activity coefficient. Normal heparin has an activity coefficient of 1 whereas a preparation with an antilipaemic activity of 70 units/mg. and an anticoagulant activity of 2.5 units/mg. has an activity coefficient of 28.

Laminarin sulfate prepared according to the present invention is administered by subcutaneous, intramuscular or intravenous injection.

The injectable compositions of the invention comprise sterile solutions or suspensions of laminarin sulfate prepared according to the process of the invention and may be adapted for intramuscular, intravenous or subcutaneous injection. A preferred composition is an aqueous solution. In addition to the active antilipaemic compound the injectable solutions may contain conventional additives, for example, agents to adjust the tonicity of the solution such as glycerol or sodium chloride. It may be desired to adjust the pH of the injectable solution to a predetermined figure to improve the stability of the preparations and accordingly pharmaceutically acceptable buffering agents may be added to the solutions. When the injectable solution is packed in a multidose container it is desirable to incorporate in the solution a preservative to maintain sterility throughout the period of use of the solution. Among the preservatives which are compatible with the active compound are included phenol cresol and methyl p-hydroxybenzoate but we do not restrict ourselves to these compounds. There may also be included solubilisers in the composition according to the present invention. For example, when using methyl p-hydroxybenzoate as a preservative we prefer to dissolve it in a small quantity of ethanol and add the alcoholic solution to the main bulk of the solution. There may also be included in the injectable composition an anti-oxidant, for example, sodium metabisulfite or acetone bisulfite.

In addition to the compositions described above which are designed for immediate response to the antilipaemic agent the active ingredient may be formulated to provide a delayed effect. Such delay compositions may be injected intramuscularly or subcutaneously and may be in the form of solutions or suspensions. A delayed action solution may be conveniently prepared by dissolving a water soluble form of the active compound in Pitkins menstruum, a well-known aqueous base comprising 15–30% gelatin, 5–12% dextrose and acetic acid. A delayed action suspension may be prepared by suspending a water insoluble derivative of the active compound in water with conventional suspending agents such as carboxymethyl cellulose or polyethylene glycol to which may be added a wetting agent if desired.

For the treatment of patients suffering from atherosclerosis laminarin sulfate prepared according to the present invention may be administered in doses of up to 250 mg. per patient per day. It will be appreciated that the dosage required by individual patients may vary considerably depending on a number of factors including the weight of the patient and the severity of his symptoms. A normal maximum dose for continuous daily treatment may be up to 3 to 4 mg./kg. body weight per day. When a satisfactory response to the initial daily treatment has been demonstrated either by blood analysis or by clinical improvement it may be possible to reduce the injections of laminarin sulfate to a maintenance regimen of weekly or bi-weekly injections.

The clinical effectiveness of laminarian sulfate prepared according to the present invention has been demonstrated in patients suffering from angina pectoris and atherosclerosis. The patients were treated initially with 200 mg. of laminarin sulfate daily by intramuscular injection for one month followed by a similar injection at weekly intervals. In all subjects there was a decrease in the ratio of serum $\beta$-lipoprotein to $\alpha$-lipoprotein as shown by electrophoresis of serum samples and this lower ratio was maintained. It is considered that a high $\beta/\alpha$ lipoprotein may indicate a condition suitable for the production of atheroma and the reduction of this lipoprotein ratio is beneficial in atherosclerotic patients. In the majority of patients, an increase in clearing factor was demonstrated and all patients claimed to feel better after commencing treatment with laminarin sulfate. No serious side effects attributable to laminarin sulfate have been noticed in any patient.

The following non-limitative examples illustrate the invention.

Example 1

In the preparation of laminarin sulfate according to the process of the invention laminarin (finely powdered to pass through a 60 mesh sieve) was dried overnight at 105° C. in vacuo and 50 gm. of the dried material (moisture content 0.2%) was dissolved in 500 ml. of dimethylformamide (moisture content less than 0.05%) by heating to 70° C. with stirring followed by cooling to −30° C.

To 250 ml. of dimethylformamide in a 400 ml. beaker cooled with stirring to −40° C., was added portionwise 35 ml. of liquid sulfur trioxide maintaining the temperature at −30° C. to −40° C. When all the sulfur trioxide had been added the temperature was raised to +10° C. until all the complex had dissolved. The solution was then cooled to −20° C. when some crystallisation took place and the suspension so obtained was added slowly to the stirred laminarin solution (prepared as described) maintaining the temperature at −20° C. to −30° C. When all the complex had been added stirring was continued for one hour at −20° C. to −30° C. and the reaction mixture was poured into 1 litre of water containing 250 ml. of 5 N sodium hydroxide solution. The alkaline solution was poured into 6.6 litres of alcohol and the solid which separated was collected by centrifugation. The solid was dissolved in 2 l. water and was dialysed through cellophane membrance against tap water for 2 days until free inorganic sulfate had been removed. The solution was concentrated in vacuo to 600 ml., and an equal volume of alcohol was added. A small brownish coloured precipitate which formed was removed by centrifugation and the clear supernatant was poured with stirring into 2.8 l. of alcohol giving a final concentration of 85% alcohol. To the colloidal solution was added 15 ml. of saturated sodium chloride solution and the solid which separated was collected by centrifugation, washed once by slurrying with alcohol, once with ether and was finally collected by filtration and was dried in vacuo over phosphorus pentoxide. There was thus obtained sodium laminarin sulfate which contained 1.46 sulfate groups per monosaccharide residue (sulfated ash 33.4%) and which had an anticoagulant activity of 1.4 units per milligram and an antilipaemic activity of 50 units per milligram, i.e., it had an activity coefficient of 35.

Example 2

In the preparation of sodium laminarin sulfate according to the process of the invention, laminarin finely powdered to pass through a 60 mesh sieve was dried overnight at 105° C. in vacuo and 50 gm. of the dried material (moisture content 0.5%) was dissolved in 500 ml. dimethylformamide (moisture content less than 0.05%) contained in a three necked round bottom flask fitted with a stirrer and suitable traps containing a drying agent for the exclusion of atmospheric moisture. Solution was effected by heating to 70° C. with stirring and this was followed by cooling to −20° C.

To 250 ml. of dimethylformamide at −40° C. in a round bottomed three necked flask fitted with a stirrer and suitable traps to exclude atmospheric moisture was added portionwise 8 ml. of liquid sulfur trioxide maintaining the temperature at −30° C. to −40° C. When all the sulfur trioxide had been added the temperature was raised to +10° C. until all the complex had dissolved as in Example 1. The solution was then cooled to −20° C. when some crystallisation took place and the suspension so obtained was added slowly to the stirred laminarin solution prepared as described, maintaining the temperature at −20° C. to −30° C. When all the complex had been added the stirring was continued for 1 hour at −20° C. to −30° C. Throughout the operations described moisture was rigidly excluded. The reaction mixture was subsequently treated exactly as described in Example 1 and there was thus obtained sodium laminarin sulfate which contained 1.04 sulfate groups per monosaccharide residue (sulfated ash 27.5%) and which had an anticoagulant activity of 1.1 units per milligram and an antilipaemic activity of 60–90 units per milligram, i.e., it had an activity coefficient of 54–81.

*Example 3*

Sodium laminarin sulfate was prepared as in Example 2 except that 29 ml. of liquid sulfur trioxide was used in the formation of the dimethylformamide sulfur trioxide complex.

There was thus obtained sodium laminarin sulfate which contained 1.3 sulfate groups per monosaccharide residue (sulfated ash 31.4%) and which had an anticoagulant activity of 3 units per milligram and an antilipaemic activity of 80 units per milligram, i.e., it had an activity coefficient of 26.

*Example 4*

In the preparation of calcium laminarin sulfate, 50 grams of finely powdered laminarin (V.M. 0.47%) was dissolved in 500 ml. of dimethylformamide and was sulfated according to the method described in Example 2 with 28 ml. of sulfur trioxide in 250 ml. of dimethylformamide. The reaction mixture was poured, with stirring, into 1 litre of an aqueous solution of calcium hydroxide containing the equivalent of 40 grams of calcium oxide, the temperature being maintained below 20° C. The solid material was centrifuged washed with water and to the clear combined liquors was added a little solid carbon dioxide to remove excess calcium. After standing, the precipitate was filtered off and the filtrate was poured into 20 litres of ethyl alcohol. The crude gummy precipitate was collected by filtration, dissolved in 250 ml. of water and 200 ml. ethyl alcohol was added. The slight precipitate was filtered off with a little kieselguhr and the clear filtrate was poured into 7 litres of acetone. The sticky precipitate was collected, dehydrated by trituration with acetone, collected by filtration and dried in vacuo.

There was thus obtained calcium laminarin sulfate (sulfated ash 30.0%) which had an antilipaemic activity of 50–100 units/mg. and an anticoagulant activity of 4.4 units/mg., i.e., it had an activity coefficient of 11–22.

*Example 5*

In the preparation of sodium laminarin sulfate 50 grams of calcium laminarin sulfate prepared according to the method described in Example 4 was dissolved in 300 ml. of distilled water. The solution was filtered to remove a slight residue and the clear filtrate was stirred for 1 hour with 250 ml. of Amberlite I.R.-120 (in the sodium phase). The aqueous solution, free of calcium and sulfate ions, was collected by filtration and the resin was washed with water. The combined filtrate and washings (700 ml.) were poured into 4 litres of ethyl alcohol and 10 ml. saturated sodium chloride was added to complete the precipitation of the product. The precipitate was collected by filtration, washed successively with alcohol and ether and dried in vacuo over phosphorus pentoxide. There was thus obtained sodium laminarin sulfate (sulfated ash 35.6%) with an antilipaemic activity of 25–50 units/mg. and an anticoagulant activity of 1.4 units/mg., i.e., it had an activity coefficient of 18–36.

*Example 6*

In the preparation of sodium laminarin sulfate, 50 grams of finely powdered laminarin (V.M. 0.34%) was dissolved in 500 ml. of dimethylformamide and sulphated according to the method described in Example 2 with 28 ml. of sulfur trioxide. The reaction mixture was poured into 1 litre of water containing 150 ml. 5 N sodium hydroxide solution and to it was added 200 ml. dimethyldodecylamine dissolved in 600 ml. water containing 50 ml. concentrated hydrochloric acid. The sticky precipitate was collected by filtration through nylon and was washed three times by stirring with 4 litres of water for 20 minutes. The sticky amine salt of laminarin sulfuric acid was dissolved in 2.5 litres of ethyl alcohol, filtered and to the filtrate was added 110 ml. of 5 N sodium hydroxide solution. The precipitate of sodium laminarin sulfate was collected by centrifugation, dissolved in 600 ml. of water and 100 ml. of ethyl alcohol was added. A small, dark coloured precipitate was centrifuged off and discarded and the clear supernatant was poured into 3.4 litres of ethyl alcohol. The precipitate was allowed to settle and the supernatant was decanted, the precipitate was washed successively with alcohol and ether and was dried in vacuo over phosphorus pentoxide. There was thus obtained sodium laminarin sulfate (sulfated ash 36.8%) which had an antilipaemic activity of 50–100 units/mg. and an anti-coagulant activity of 3.7 u./mg., i.e., it had an activity coefficient of 13–26.

*Example 7*

In the purification of sodium laminarin sulphate, 70 grams of crude sodium laminarin sulfate (sulfated ash 34.2%), antilipaemic activity 50 units/mg. anti-coagulant activity 3.1 units/mg., prepared as described in Example 2, was dissolved in 400 ml. of water to give a dark brown solution, it was made alkaline to Thymol blue paper with sodium hydroxide and there was added 6 ml. of 40% sodium permanganate solution sufficient to give slight excess. The mixture was stirred for 20 minutes and was then heated to 60° C. for 10 minutes. The slight excess of permanganate was destroyed by the addition of a few drops of ethyl alcohol, the precipitated manganese dioxide was filtered off, washed with a little water at pH 8.5 containing sodium chloride and the combined pale yellow filtrate and washings were dialysed against tap water for 36 hours. There was added to the dialysate (1 litre) 25 ml. of saturated sodium chloride solution and it was precipitated by pouring into 5 litres of ethyl alcohol. The precipitate was collected by filtration, washed with alcohol and ether and dried in vacuo over phosphorus pentoxide. There was thus obtained as a white powder, sodium laminarin sulfate (sulfated ash 28.2%) with an antilipaemic activity of 50–100 units/mg. and an anticoagulant activity of 3.7 units/mg., i.e., it had an activity coefficient of 13–26.

*Example 8*

In the preparation of potassium laminarin sulfate an equal volume of 60% aqueous potassium acetate solution was added to a 10% aqueous solution of sodium laminarin sulfate prepared as in Example 1. The white precipitate which formed was collected by filtration washed with ethanol and dried to give potassium laminarin sulfate as a white amorphous solid.

Example 9

In the preparation of sodium laminarin sulfate 120 grams of laminarin was refluxed for 6 hours with 1200 ml. 0.025 N hydrochloric acid, the mixture was cooled, neutralised with aqueous sodium hydroxide solution and decoloured with 35 grams of charcoal. The solution comprising the degraded laminarin, after filtering off the charcoal, was concentrated in vacuo to 550 ml. and 200 ml. of ethanol was added to the concentrate. A small precipitate was filtered off and discarded and 1400 ml. of ethanol was added to the filtrate. The solid was collected by filtration and suspended in as little water as possible and dialysed overnight to remove low molecular weight fractions.

The dialysed solution was reprecipitated with 3 volumes of ethanol collected by centrifugation and dried.

A solution of 7 grams of the above degraded laminarin in 70 ml. dimethylformamide was sulfated as described in Example 1 with 4.6 ml. of sulfur trioxide dissolved in 35 ml. dimethylformamide for one hour at a temperature of —20° C. to —30° C. An isolation procedure was followed similar to that described in Example 1 with the additional purification step by means of sodium permanganate as described in Example 7 and there was obtained sodium laminarin sulfate with sulfated ash content of 30% and anticoagulant activity of 3.75 u./mg. and an antilipaemic activity of 50–100 u./mg., i.e., an activity coefficient of 15–30.

Example 10

A solution of 10 grams of degraded laminarin (prepared as in Example 9) in 90 ml. dimethylformamide was sulphated with 7 ml. sulfur trioxide dissolve in 60 ml. dimethylformamide at a temperature of —20° C. to —30° C. for one hour. An isolation procedure was followed similar to that described in Example 1 except that the reaction mixture was neutralized with aqueous potassium hydroxide instead of sodium hydroxide. There was thus obtained potassium laminarin sulfate with a sulfated ash content of 31.9% an anticoagulant activity of 12.5 u./mg. and an antilipaemic activity of 100 u./mg., i.e., an activity coefficient of 8.

Example 11

A solution of 7 grams of degraded laminarin (prepared as in Example 9) in 70 ml. dimethylformamide was sulphated as described in Example 1 with 5.2 ml. liquid sulfur trioxide dissolved in 35 ml. dimethylformamide for one hour at room temperature (20–22° C.). The product was isolated as described in Example 1 and there was obtained sodium lamination sulfate with a sulfated ash content of 38.3% and anti-coagulant activity of 9 u./mg. and an antilipaemic activity of 100 u./mg., i.e., an activity coefficient of 11.

*Preparation 1.—Laminarinase:* A batch of nutrient medium was prepared of the following composition:

| | | |
|---|---|---|
| Potassium di-hydrogen phosphate | g | 2.0 |
| Ammonium sulfate | g | 1.4 |
| Urea | g | 0.3 |
| Magnesium sulfate heptahydrate | g | 0.3 |
| Calcium chloride | g | 0.3 |
| Laminarin | g | 10.0 |
| Peptone | g | 2.5 |
| Yeast extract | g | 2.5 |
| Iron | μg | 10 |
| Manganese | μg | 5 |
| Cobalt | μg | 5 |
| Zinc | μg | 8 |
| Soil extract | ml | 250 |

Water, to 1 litre.

4 litres of this medium was sterlized, inoculated with a culture of *Trichoderma viride*, and incubated at 25° C. for 75 hours with an aeration rate of 4 l./min. and a stirring rate of 500 r.p.m. At harvest, the broth was neutralised then clarified by centrifugation and filtration. The clear filtrate was cooled and precipitated by the addition of 2 volumes of cold acetone. The precipitate was collected at the centrifuge and suspended in water (115 ml.). This preparation of laminarinase was stored at 4° C. until used.

*Preparation 2.—Enzyme degraded laminarin:* Laminarin (60 g.) was dissolved in hot sodium acetate buffer (0.05 N, pH 5.8, 2.41 l.) and cooled to 37° C. Laminarinase suspension (62.5 ml.) prepared as described in Preparation 1 was added and the mixture was incubated at 37° C. with stirring for one hour.

The mixture was boiled to inactivate the enzyme and was then concentrated in vacuo to about ⅙ volume. The concentrate was dialysed for 3 day, precipitated with 3 volumes of ethanol, washed with ethanol and dried. The degradation was estimated by Somogyi's method at 25.6%.

*Preparation 3.—Enzyme degraded laminarin:* Laminarin was degraded enzymically by the method of Preparation 2 except that incubation was only continued for 40 minutes. The degraded laminarin was estimated by Somogyi's method to be 11.1% degraded.

Example 12

Partially degraded laminarin (7 g.) prepared as described in Preparation 3 was dissolved in dimethylformamide (60 ml.) and sulphated at —20° C. to —30° C. for one hour with sulfur trioxide (4.8 ml.) dissolved in dimethylformamide (45 ml.). The sodium laminarin sulfate was isolated as described in Example 1. The product had a sulfated ash content of 31.8% an anti-lipaemic activity of >100% and an anticoagulant activity of 14 u./mg., i.e., an activity coefficient of >7.

Example 13

Acid degraded laminarin (7.0 g.) was sieved through a 60 mesh sieve and suspended in diethylformamide (80 cc.). The stirred suspension was sulphated at —20° C. to —30° C. for one hour with a sulfur trioxide complex prepared from sulfur trioxide (7.4 cc.) and diethylformamide (50 cc.) the reaction mixture remained a suspension throughout and when poured into aqueous alkali gave a clear solution. The sodium laminarin sulfate was precipitated with ethanol and purified by dialysis as described in Example 1 to give sodium laminarin sulfate with a sulfated ash content of 28.3% an anticoagulant activity of 3.9 units/mg. and an antilipaemic activity of >100, i.e., an activity coefficient of >25.

Example 14

Acid degraded laminarin (7.0 g.) was dissolved in dimethylacetamide (70 cc.) and sulphated at —10° C. to —20° C. for 1¼ hours by adding sulfur trioxide (14 cc.) in the form of a complex with dimethylformamide (60 cc.). The reaction mixture was poured into aqueous alkali and the sodium laminarin sulfate isolated as described in Example 1 to give sodium laminarin sulfate, sulphated ash 39.0% anticoagulant activity 1.6 units/mg., anti-lipaemic activity >100, i.e., an activity coefficient of >50.

Example 15

An injectable composition was prepared by dissolving sodium laminarin sulfate prepared according to Example 9 in distilled water filtering sterile and adding sterile distilled water to give a 6.7% solution.

The solution was filled into sterile ampoules containing 3 cc. of solution. Each ampoule which contained 200 mg. of sodium laminarin sulfate was sufficient for one dose for an adult human.

We claim:

1. A process for the preparation of laminarin sulfate with a degree of polymerization between 9 and 20 and containing between 0.9 and 2.0 sulphate groups per monosaccharide residue and the sodium salt of which has an antilipaemic to anticoagulant ratio of not less than 5 which comprises sulphating laminarin having a molecular weight in the range of 1500–3000 dissolved in a dialkyl amide of the formula $RCON(R')_2$, wherein R is selected from the group consisting of hydrogen and methyl and R' is selected from the group consisting of methyl and ethyl, with sulphur trioxide in a liquid reaction mixture essentially consisting of such laminarin, dialkyl amide and sulphur trioxide at a temperature below 22° C.

2. A process as claimed in claim 1 comprising in addition forming a salt of the laminarin sulfate produced selected from the group consisting of the sodium, potassium and calcium salts.

3. A process as claimed in claim 2 comprising in addition treating said salt under aqueous conditions at a pH between about 8 and 9 with a water soluble salt of permanganic acid.

4. A process as claimed in claim 1, in which the sulfur trioxide is introduced as a complex with N,N-dimethylformamide.

5. A process as claimed in claim 1, in which the sulfation is carried out at a temperature below 0° C.

6. A process as claimed in claim 5, wherein the sulfation temperature is between −20° C. and −30° C.

7. A process for making a salt of laminarin sulfate with a degree of polymerization between 9 and 20 and containing between 0.9 and 2.0 sulfate groups per monosaccharide residue and having an anti-lipaemic to anti-coagulant ratio of not less than 5 which comprises:
 (a) Dissolving 50 parts of laminarin having a molecular weight in the range of 1500–3000 in dialkyl formamide in which the alkyl groups are of 1 to 2 carbon atoms;
 (b) Slowly adding to the laminarin a dialkylformamide/sulfur trioxide complex prepared from a dialkyl formamide in which the alkyl groups are of 1 to 2 carbon atoms and between 5 and 40 parts of sulfur trioxide at a temperature between −40° C. and +20° C.
 (c) Forming a water soluble salt of the laminarin sulfate formed after the sulfation reaction has been completed;
 (d) Treating an aqueous solution of the salt of laminarin sulfuric acid with a solution of a salt of permanganic acid;
 (e) Dialysing the solution of the permanganate treated salt to remove dialysable material.

References Cited by the Examiner

UNITED STATES PATENTS

| | | | |
|---|---|---|---|
| 2,211,338 | 8/40 | Malm | 260—234 |
| 2,589,226 | 3/52 | Carson | 260—234 |
| 2,697,093 | 12/54 | Jones | 260—234 |
| 2,786,833 | 3/57 | Warzburg et al. | 260—234 |
| 2,937,117 | 5/60 | Cottet | 167—65 |
| 2,954,372 | 9/60 | Novak | 260—234 |
| 2,980,585 | 4/61 | Stamball | 167—65 |
| 3,017,407 | 1/62 | Petracek et al. | 260—234 |

FOREIGN PATENTS

| | | |
|---|---|---|
| 118,014 | 1/47 | Sweden. |
| 1,000,366 | 1/57 | Germany. |

OTHER REFERENCES

Chemical Abstracts, vol. 49, col. 11,897.
Chemical Abstracts, vol. 52, col 587(g).
Chemical Abstracts, vol. 52, col. 6638(1).
O'Neill, A. N., Can. J. Chem., volume 33 (1955), pages 1097–1101.
Trygve Braarud et al., Second International Seaweed Symposium (1956), pp. 55–61.

LEWIS GOTTS, *Primary Examiner.*

WILLIAM B. KNIGHT, ABRAHAM H. WINKELSTEIN, CHARLES B. PARKER, *Examiners.*